United States Patent
MacDonald

(10) Patent No.: US 10,870,777 B2
(45) Date of Patent: Dec. 22, 2020

(54) ABSORBENT AND PROTECTIVE COMPOSITION CONTAINING AN ELASTOMERIC COPOLYMER

(71) Applicant: KIMBERLY-CLARK WORLDWIDE, INC., Neenah, WI (US)

(72) Inventor: John Gavin MacDonald, Decatur, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 141 days.

(21) Appl. No.: 15/778,955

(22) PCT Filed: Dec. 1, 2016

(86) PCT No.: PCT/US2016/064430
§ 371 (c)(1),
(2) Date: May 24, 2018

(87) PCT Pub. No.: WO2017/096048
PCT Pub. Date: Jun. 8, 2017

(65) Prior Publication Data
US 2018/0346754 A1    Dec. 6, 2018

Related U.S. Application Data

(60) Provisional application No. 62/261,652, filed on Dec. 1, 2015.

(51) Int. Cl.
| | |
|---|---|
| C08J 5/18 | (2006.01) |
| B29D 7/01 | (2006.01) |
| C09D 153/02 | (2006.01) |
| C09D 7/40 | (2018.01) |
| C09D 123/08 | (2006.01) |
| C09D 5/20 | (2006.01) |
| D06M 23/16 | (2006.01) |
| D06M 15/693 | (2006.01) |
| D06M 15/233 | (2006.01) |
| D06M 15/227 | (2006.01) |
| D06P 1/00 | (2006.01) |

(52) U.S. Cl.
CPC .............. *C09D 153/02* (2013.01); *C08J 5/18* (2013.01); *C09D 5/20* (2013.01); *C09D 7/40* (2018.01); *C09D 123/08* (2013.01); *D06M 15/227* (2013.01); *D06M 15/233* (2013.01); *D06M 15/693* (2013.01); *D06M 23/16* (2013.01); *D06P 1/0012* (2013.01); *C08J 2300/26* (2013.01); *C08J 2323/08* (2013.01); *C08J 2353/00* (2013.01)

(58) Field of Classification Search
None
See application file for complete search history.

(56) References Cited

U.S. PATENT DOCUMENTS

| | | | |
|---|---|---|---|
| 3,338,992 A | 8/1967 | Kinney | |
| 3,341,394 A | 9/1967 | Kinney | |
| 3,360,509 A * | 12/1967 | Uhl | ....................... C09B 62/489 |
| | | | 534/630 |
| 3,380,864 A | 4/1968 | Broderick | |
| 3,485,706 A | 12/1969 | Evans | |
| 3,502,538 A | 3/1970 | Petersen | |
| 3,502,763 A | 3/1970 | Hartmann | |
| 3,542,615 A | 11/1970 | Dobo | |
| 3,692,618 A | 9/1972 | Carduck | |
| 3,802,817 A | 4/1974 | Goto | |
| 3,844,869 A | 10/1974 | Rust | |
| 3,849,241 A | 11/1974 | Butin | |
| 3,939,033 A | 2/1976 | Grgach | |
| 4,041,203 A * | 8/1977 | Brock | ....................... B32B 5/08 |
| | | | 428/157 |
| 4,051,298 A * | 9/1977 | Misiura | .................... C09D 5/20 |
| | | | 428/383 |
| 4,100,324 A | 7/1978 | Anderson | |

(Continued)

FOREIGN PATENT DOCUMENTS

| | | |
|---|---|---|
| CN | 1129237 A | 8/1996 |
| CN | 101094644 A | 12/2007 |

(Continued)

OTHER PUBLICATIONS

Kohli. Strippable Coatings for Removal of Surface Contaminants. Developments in Surface Contamination and Cleaning. Particle Deposition, Control and removal. 2010. pp. 177-224 (Year: 2010).*

(Continued)

*Primary Examiner* — Cachet I Proctor
(74) *Attorney, Agent, or Firm* — Kimberly-Clark Worldwide, Inc.

(57) ABSTRACT

An improved composition for protecting a vehicle, building, or airplane surface that will be painted or mechanically processed. For example, certain regions of a vehicle, building, or airplane may be masked in accordance with the present disclosure to protect those regions from paint overspray. The composition produces a film which adheres well to a surface to be protected, with few or no pinholes. Additionally, the composition can absorb any oil or grease present on the surface which can eliminate the need for towels and chemical solvents that may create toxic fumes, hazardous waste, and flammable hazards. Further, the material can be removed easily from the surface after use by peeling the film layer away from the surface.

12 Claims, No Drawings

(56) References Cited

U.S. PATENT DOCUMENTS

| | | |
|---|---|---|
| 4,259,399 A | 3/1981 | Hill |
| 4,301,194 A | 11/1981 | Borja |
| 4,340,563 A | 7/1982 | Appel |
| 4,440,597 A | 4/1984 | Wells |
| 4,551,199 A | 11/1985 | Weldon |
| 4,720,415 A | 1/1988 | Vander Wielen |
| 4,737,394 A | 4/1988 | Zafiroglu |
| 4,781,966 A | 11/1988 | Taylor |
| 4,832,852 A | 5/1989 | Wells |
| 4,849,054 A | 7/1989 | Klowak |
| 5,048,589 A | 9/1991 | Cook |
| 5,096,532 A | 3/1992 | Neuwirth |
| 5,110,403 A | 5/1992 | Ehlert |
| 5,114,781 A | 5/1992 | Morman |
| 5,129,988 A | 7/1992 | Farrington |
| 5,186,978 A | 2/1993 | Woodhall |
| 5,229,191 A | 7/1993 | Austin |
| 5,266,394 A * | 11/1993 | Diehl ............... A61L 15/58 442/398 |
| 5,292,582 A | 3/1994 | Gibbs |
| 5,308,647 A | 5/1994 | Lappi |
| 5,352,531 A * | 10/1994 | Roberts ............ C09D 145/00 428/446 |
| 5,382,400 A | 1/1995 | Pike |
| 5,385,775 A | 1/1995 | Wright |
| 5,393,582 A | 2/1995 | Wang |
| 5,399,412 A | 3/1995 | Sudall |
| 5,407,718 A * | 4/1995 | Popat ................. C09J 7/21 428/41.5 |
| 5,420,015 A | 5/1995 | Wuerch |
| 5,494,554 A | 2/1996 | Edwards |
| 5,503,908 A | 4/1996 | Faass |
| 5,508,102 A | 4/1996 | Georger |
| 5,618,578 A | 4/1997 | Blaine |
| 5,620,779 A | 4/1997 | Levy |
| 5,656,132 A | 8/1997 | Farrington |
| 5,667,636 A | 9/1997 | Engel |
| 5,716,625 A | 2/1998 | Hahn et al. |
| 5,817,199 A | 10/1998 | Brennecke |
| 5,830,321 A | 11/1998 | Lindsay |
| 5,851,935 A | 12/1998 | Srinivasan et al. |
| 5,960,508 A | 10/1999 | Holt |
| 6,015,764 A | 1/2000 | McCormack et al. |
| 6,017,417 A | 1/2000 | Wendt |
| 6,022,582 A | 2/2000 | Van Tyle |
| 6,025,050 A | 2/2000 | Srinivasan et al. |
| 6,048,123 A | 4/2000 | Holt |
| 6,075,179 A | 6/2000 | McCormack et al. |
| 6,117,485 A | 9/2000 | Woodhall |
| 6,132,841 A | 10/2000 | Guthrie |
| 6,269,513 B1 | 8/2001 | Torobin |
| 6,458,877 B1 | 10/2002 | Ahmed |
| 6,464,824 B1 | 10/2002 | Hofmann |
| 6,550,092 B1 | 4/2003 | Brown |
| 6,797,357 B2 | 9/2004 | Fereshtehkhou |
| 6,849,685 B2 | 2/2005 | Soerens |
| 6,884,494 B1 | 4/2005 | Curro et al. |
| 6,946,413 B2 | 9/2005 | Lange et al. |
| 6,964,989 B1 | 11/2005 | Fang |
| 6,991,852 B2 | 1/2006 | Carr |
| 7,037,569 B2 | 5/2006 | Curro et al. |
| 7,239,355 B2 * | 7/2007 | Smith .................. G06T 3/40 348/349 |
| 7,270,861 B2 | 9/2007 | Broering et al. |
| 7,312,286 B2 | 12/2007 | Lang |
| 7,335,713 B2 | 2/2008 | Lang |
| 7,614,812 B2 | 11/2009 | Reddy |
| 7,651,290 B2 | 1/2010 | Bauer |
| 7,691,760 B2 | 4/2010 | Bergsten et al. |
| 7,704,313 B2 | 4/2010 | Ohlhausen |
| 7,722,589 B2 | 5/2010 | Fitts, Jr. et al. |
| 7,767,058 B2 | 8/2010 | Walton |
| 8,066,444 B2 | 11/2011 | Rippl |
| 8,198,200 B2 | 6/2012 | Autran et al. |
| 8,241,543 B2 | 8/2012 | Hugh |
| 8,282,776 B2 | 10/2012 | Smith et al. |
| 8,361,913 B2 | 1/2013 | Siqueira et al. |
| 8,603,281 B2 | 12/2013 | Welch et al. |
| 8,728,336 B2 | 5/2014 | Raji |
| 8,921,474 B2 | 12/2014 | Alper et al. |
| 9,226,629 B2 | 1/2016 | Gummow |
| 9,260,808 B2 | 2/2016 | Schmidt |
| 9,315,929 B2 | 4/2016 | Sheehan |
| 9,826,876 B2 | 11/2017 | Yang et al. |
| 10,751,305 B2 * | 8/2020 | Zhang ................ A61K 9/0014 |
| 2002/0127937 A1 | 9/2002 | Lange et al. |
| 2002/0150610 A1 | 10/2002 | Kono et al. |
| 2002/0177376 A1 * | 11/2002 | Welch .................... B32B 5/08 442/50 |
| 2003/0032706 A1 | 2/2003 | Blaine |
| 2003/0134552 A1 | 7/2003 | Mehawej |
| 2003/0171051 A1 | 9/2003 | Bergsten |
| 2004/0091658 A1 | 5/2004 | Ginkel |
| 2004/0121683 A1 | 6/2004 | Jordan et al. |
| 2004/0131820 A1 | 7/2004 | Turner et al. |
| 2005/0027024 A1 * | 2/2005 | Zhang .................. C09D 5/20 521/50 |
| 2005/0148260 A1 | 7/2005 | Kopacz et al. |
| 2005/0160543 A1 | 7/2005 | Catalfamo et al. |
| 2006/0068167 A1 | 3/2006 | Keck et al. |
| 2006/0083900 A1 | 4/2006 | Ashraf |
| 2007/0014921 A1 * | 1/2007 | Kimball .............. B44D 2/007 427/258 |
| 2007/0049153 A1 | 3/2007 | Dunbar |
| 2007/0207269 A1 | 9/2007 | Woodhall |
| 2008/0138142 A1 * | 6/2008 | Pressman ............. C09D 5/20 401/183 |
| 2008/0280036 A1 * | 11/2008 | Mesa .................... C09D 5/20 427/154 |
| 2009/0036014 A1 * | 2/2009 | Torres .................. C09K 3/30 442/327 |
| 2009/0151748 A1 | 6/2009 | Ridenhour |
| 2009/0325447 A1 | 12/2009 | Austin et al. |
| 2010/0167075 A1 * | 7/2010 | Mesa .................... C09D 5/20 428/524 |
| 2010/0196653 A1 | 8/2010 | Curro et al. |
| 2010/0212849 A1 | 8/2010 | Smith |
| 2010/0233273 A1 | 9/2010 | Burton |
| 2010/0316803 A1 | 12/2010 | Uang |
| 2010/0317802 A1 | 12/2010 | Aoyama |
| 2012/0328862 A1 | 12/2012 | Fukudome |
| 2013/0126070 A1 | 5/2013 | Siqueira et al. |
| 2013/0251897 A1 | 9/2013 | Uang |
| 2013/0283557 A1 | 10/2013 | Gibis |
| 2013/0295312 A1 | 11/2013 | Balakoff |
| 2015/0030763 A1 | 1/2015 | Chan |
| 2015/0089755 A1 | 4/2015 | Yang |
| 2015/0143653 A1 | 5/2015 | Thomas |
| 2015/0175793 A1 | 6/2015 | DeMarco et al. |

FOREIGN PATENT DOCUMENTS

| | | |
|---|---|---|
| CN | 101376729 A | 3/2009 |
| CN | 101475771 | 7/2009 |
| GB | 1311002 A | 3/1973 |
| WO | WO0031331 A1 | 6/2000 |
| WO | 15095731 A1 | 6/2015 |

OTHER PUBLICATIONS

Ansems, Patricia et al., "Oil Extension of Olefin Block Copolymers," ANTEC, Society of Plastics Engineers (SPE), 2007, 6 pages.

* cited by examiner

ABSORBENT AND PROTECTIVE COMPOSITION CONTAINING AN ELASTOMERIC COPOLYMER

CROSS-REFERENCE TO RELATED APPLICATIONS

This application claims priority to U.S. Provisional Patent Application No. 62/261,652 filed Dec. 1, 2015, the contents of which is hereby incorporated by reference in its entirety for all purposes.

BACKGROUND OF THE DISCLOSURE

In the automobile, building and aviation industries, painting operations often require masking of certain portions of the vehicle, building, or airplane to prevent overspray. For example, it is often necessary to mask trim and windows on a vehicle or airplane to protect those areas from paint overspray. Also, building windows must be protected from paint or primer coats. On occasion, it is necessary to mask painted portions of a vehicle, building, or airplane from paints of a different color as well as overspray of paints of the same color. In practice, masking operations are often one of the most time consuming and, therefore, expensive parts of the painting process. In spite of attempts to develop suitable chemical masks for painting, painters continue to primarily use masking tape and paper to cover portions of a vehicle, building, or airplane where paint is not desired. Masking the trim on a car, however, often requires many hours of tedious labor. Furthermore, even when done carefully, defects in such paint masks allow paint to contact surfaces which are desired to be protected.

Additionally, many of the operations involved in the construction of a vehicle, building, or airplane can leave oil and grease behind on a surface which later needs to be painted. These surfaces can also be susceptible to marring and scratching as some processes, such as, for example, welding and grinding, can have deleterious effects on surrounding surfaces.

Solutions have been proposed to the problems of protecting surfaces during mechanical processing operations and painting. However, such techniques have often not found extensive use. Some of the proposed chemical masks have been unsuitable for application to portions of a vehicle, building, or airplane because of damage which would potentially occur to the protected portions of the vehicle, building, or airplane. Other compositions are difficult to apply, difficult to remove, excessively costly, or the like. In addition to issues with attempts previously made to protect surfaces, issues also exist with methods currently in use to clean such surfaces from contaminants such as oil and grease. Some of the current methods of cleaning oil and grease use towels and cleaning solvents which can generate toxic fumes, hazardous waste and flammable hazards.

There is a need for an improved composition which can be used to protect surfaces. There is a need for an improved composition which is easy to apply to the desired surface, can protect the surface and is easily removed from the surface without causing damage to the surface. There is a need for an improved composition which can be used in a variety of industries and can reduce the levels of toxic fumes, hazardous waste and flammable hazards that a worker may be exposed to.

SUMMARY OF THE DISCLOSURE

In various embodiments, a liquid composition can have an elastomeric copolymer and a solvent in which the elastomeric copolymer is dissolved wherein the composition is configured to dry after being applied to a surface, leaving an elastomeric copolymer film. In various embodiments, the elastomeric copolymer is oleophilic. In various embodiments, the elastomeric copolymer is selected from polystyrene-polyisoprene-polystyrene, polystyrene-block-polybutadiene-block-polystyrene, polystyrene-block-poly(ethylene-ran-polybutylene)-block-polystyrene, polystyrene-block-polybutadiene-block-polystyrene, alpha-methylstyrene-vinyltoluene-copolymer, and ethylene-octene-1 copolymer. In various embodiments, the solvent is selected from mineral spirits, methylethylketone, toluene, p-xylene, tetrahydrofuran, and dimethoxymethane. In various embodiments, the composition is configured to be sprayable. In various embodiments, the composition further has a color changing indicator.

In various embodiments, a method of absorbing an oil-based contaminant from a surface can include the steps of applying the liquid composition to a surface having an oil-based contaminant thereon, allowing the liquid composition to dry, and peeling the dried composition from the surface.

In various embodiments, a method of protecting a surface in vehicle, building, or airplane painting operations from paint overspray can include the steps of applying the liquid composition to the surface to be protected, allowing the liquid composition to dry, painting the vehicle, building or airplane, the dried composition preventing the paint from contacting the surface to be protected, and peeling the dried composition from the surface.

In various embodiments, the liquid composition can be applied to a nonwoven material. In various embodiments, the liquid composition is applied to the nonwoven material in a pattern wherein the pattern comprises at least one of a dot, line, circle, or wavy line. In various embodiments, a method of absorbing an oil-based contaminant from a surface can include the step of wiping the contaminated surface with the nonwoven. In various embodiments, the method can further include the step of wiping a second surface with the nonwoven wherein the oil-based contaminant is not transferred to the second surface from the nonwoven.

DETAILED DESCRIPTION OF THE DISCLOSURE

The present disclosure provides an improved composition for protecting a surface of a vehicle, building, or airplane that will be painted or mechanically processed. For example, certain surfaces of a vehicle, building, or airplane may be masked in accordance with the present disclosure to protect those surfaces from paint overspray as well as from marring, scratching, or other deleterious effects associated with mechanical processing. The composition described herein produces a film which adheres well to a surface to be protected, with few or no pinholes. Additionally, the composition described herein can absorb any oil or grease present on the surface which can eliminate the need for towels and chemical solvents that may create toxic fumes, hazardous waste, and flammable hazards. Further, the composition described herein can be removed easily from the surface after use by peeling the film layer away from the surface. In addition to being applied directly to a surface as a protective coating and/or absorbent, the composition described herein may be applied to a wipe or a paper product and used to wipe a surface clean.

In various embodiments, the composition of the present disclosure includes a copolymer that can demonstrate the following desired attributes. A desired attribute of the copolymer utilized in the composition described herein is that the copolymer is soluble in a solvent. A benefit of the currently described composition is that it can be applied via brush, spray, or roller application. Such application is less time consuming than utilizing masking tape to adhere a protective material to a surface to be protected. Another desired attribute of the copolymer utilized in the composition described herein is that it demonstrate good adhesion to a variety of surfaces. A benefit of the currently described composition is the ability to apply the composition to a variety of surfaces such that it can be utilized in a variety of industries as a protective coating. The composition should also demonstrate good adherence to the desired surface such that it does not shift during processing such as painting. Another desired attribute of the copolymer utilized in the composition described herein is that it be elastomeric in physical property in order that the composition can be easily peeled off of the surface which the composition had been protecting. A benefit of the composition described herein is that it can be peeled off as a single piece leaving a clean surface behind.

A copolymer which can demonstrate the attributes described above is a thermoplastic elastomer. In order for a material to qualify as a thermoplastic elastomer, the material must have these three essential characteristics: 1) the ability to be stretched to moderate elongations and, upon the removal of stress, return to something close to its original shape; 2) the material can be processed as a melt at elevated temperature; and 3) there is an absence of significant creep.

There are six generic classes of commercial thermoplastic elastomers ("TPEs") which are: 1) styrenic block copolymers ("TPE-s"); 2) polyolefin blends ("TPE-o"); 3) elastomeric alloys ("TPE-v" or "TPV"); 4) thermoplastic polyurethanes ("TPU"); 5) thermoplastic copolyester; and 6) thermoplastic polyamides. Examples of TPE copolymers that come from a block copolymer group include Santoprene (by ExxonMobile), Termoton (by Termopol Polimer), Arnitel (by DSM), Solprene (by Dynasol), Engage (by Dow Chemical), Hytrel (by DuPont), Dryflex and Mediprene (by ELASTO), Kraton (by Kraton Polymers), and Pibiflex. Examples of TPV copolymers include FORPRENE and TERMOTON-V. Examples of styrenic block copolymers (TPE-s) are SOFPRENE (SBS) and LAPRENE (SEBS).

More specific examples of thermoplastic elastomers include polystyrene-polyisoprene-polystyrene (the styrene can be present at 14 wt %, 17 wt % or 22 wt %), polystyrene-block-polybutadiene-block-polystyrene (the molecular weight can be about 140,000 and the styrene can be present at 30 wt %), polystyrene-block-poly(ethylene-ran-polybutylene)-block-polystyrene (the molecular weight can be either about 89,000 or 118,000), polystyrene-block-polybutadiene-block-polystyrene (Kraton™ types), alpha-methylstyrene-vinyltoluene-copolymer (Eastman™ Regalrez® resin), and ethylene-octene-1 copolymer (Dow™ Affinity® polyolefin plastomer or Infuse®).

To formulate the composition described herein, the copolymer should be soluble in a solvent in order to formulate a composition which can be applied via a brush or spraying. Examples of suitable solvents include mineral spirits, methylethylketone, toluene, p-xylene, tetrahydrofuran, and dimethoxymethane.

The composition described herein can be made by conventional means, typically including the steps of incorporating the copolymer into the solvent at room temperature and allowing the copolymer to fully dissolve in the solvent. This can be further aided by mixing the solution of the solvent and the copolymer so as to form a substantially homogenous composition. The composition can, therefore, be applied to the desired surface or, in various embodiments as described herein, to a hydroknit wipe or paper product. Various techniques for application of the composition to a surface, wipe or paper product include brushing and spraying of the composition. If the composition is applied to a surface as a protective or absorbent coating, the composition can be allowed to dry at room temperature, such as, for about 10 to 15 seconds, thereby forming a dried composition film which can have a thickness from about 0.5 or 1.5 mils to about 2, 2.5, or 4 mils thick.

As described herein, the composition of the current disclosure can be beneficial as a protective coating on surfaces such as those that are going to be painted. The protective coating can prevent paint overspray from contaminating a surface which is desired to be protected from the paint overspray. To protect the desired surface from being contaminated by paint overspray, the composition described herein can be sprayed onto the surface which is desired to be protected, can be allowed to dry, such as, for about 10 to 15 seconds, paint the area which needs to be painted, and the dried composition can be peeled away from the protected surface leaving a clean surface.

It various embodiments, the composition described herein can absorb oil-based contaminants, such as oil and grease, from a surface. The composition described herein is oleophilic through the usage of thermoplastic elastomers and can, therefore, demonstrate an affinity for oil based contaminants such as oil and grease. In various embodiments, to absorb an oil based contaminant such as oil or grease from a surface, the composition described herein can be sprayed onto the surface whereupon the oil based contaminant is located, can be allowed to dry, such as, for about 10 to 15 seconds, and the dried composition can be peeled away from the surface thereby removing the oil based contaminants leaving a clean surface.

In various embodiments, it may be desirable to incorporate a visual change indicator into the liquid composition to alert a user of the liquid composition that the composition has dried and is ready to either be removed from the surface or the user can continue processing the surface, such as, for example, applying a paint to the surface.

In various embodiments, it may be desired to incorporate the composition described herein onto a wipe, such as a hydroknit, which can be used in industrial applications, or onto a paper product which can be used in consumer applications. In various embodiments, the composition can be applied to the wipe or paper product in a pattern. In various embodiments, the pattern can have at least one of a dot, line, circle, or wavy line.

Hydroknit Wipe:

A hydroknit wipe can be formed by hydraulically entangling a wet laid pulp layer with a continuous filament nonwoven substrate.

A suspension of pulp fibers can be wet laid onto a forming fabric of a conventional papermaking machine. In various embodiments, the suspension may contain from about 0.01 to about 1.5 percent by weight pulp fibers suspended in water. Water is removed from the suspension of pulp fibers to form a uniform layer of pulp fibers. The pulp fibers may be any high average fiber length pulp, low average fiber length pulp, or mixtures of the same. The high average fiber length pulp typically have an average fiber length from about 1.5 mm to about 6 mm. The low average fiber length pulp may be, for example, certain virgin hardwood pulps and secondary (i.e., recycled) fiber pulp from sources such as, for example, newsprint, reclaimed paperboard, and office waste. The low average fiber length pulps typically have an average fiber length of less than about 1.2 mm, for example, from 0.7 mm to 1.2 mm. Mixtures of high average fiber length and low average fiber length pulps may contain a significant proportion of low average fiber length pulps. For example, mixtures may contain more than about 50 percent by weight low average fiber length pulp and less than about 50 percent by weight high average fiber length pulp. One exemplary mixture contains 75 percent by weight low average fiber length pulp and about 25 percent high average fiber length pulp. The pulp fibers may be unrefined or may be beaten to various degrees of refinement. Small amounts of wet strength resins and/or resin binders may be added to improve strength and abrasion resistance. Cross-linking agents and/or hydrating agents may also be added to the pulp mixture. Debonding agents may be added to the pulp mixture to reduce the degree of hydrogen bonding if a very open or loose nonwoven pulp fiber web is desired.

A continuous filament nonwoven substrate may be formed by any known continuous filament nonwoven extrusion processes, such as, for example, known solvent spinning or melt-spinning processes. In various embodiments, the continuous filament nonwoven substrate is a nonwoven web of conjugate spun filaments. Description of such filaments and a method for making the same may be found in, for example, U.S. Pat. No. 5,382,400 to Pike, et al., the disclosure of which is incorporated herein by reference to the extent it does not conflict with the disclosure herein. Such filaments may be shaped filaments, sheath/core filaments, side-by-side filaments or the like.

The spunbond filaments may be formed from any melt-spinnable polymer, copolymer or blends thereof. Desirably, the conjugate spun filaments are conjugate melt-spun filaments. More desirably, the conjugate spun filaments are conjugate melt-spun filaments composed of at least one low softening point component and at least one high softening point component (in which at least some of the exterior surfaces of the filaments are composed of at least one low softening point component). One polymeric component of the conjugate melt-spun filaments should be a polymer characterized as a low softening point thermoplastic material (e.g., one or more low softening point polyolefins, low softening point elastomeric block copolymer, low softening point copolymers of ethylene and at least one vinyl monomer (such as, for example, vinyl acetates, unsaturated aliphatic monocarboxylic acids, and esters of such monocarboxylic acids) and blends of the same). For example, polyethylene may be used as a low softening point thermoplastic material. Another polymeric component of the conjugate melt-spun filaments should be a polymer characterized as a high softening point material (e.g., one or more polyesters, polyamides, high softening point polyolefins, and blends of the same). For example, polypropylene may be used as a high softening point thermoplastic material.

The conjugate spun filaments may include from about 20 to about 85 percent, by weight, of the high softening point component and from about 15 to about 80 percent, by weight, of the low softening point component. For example, the conjugate spun filaments may include from about 40 to about 75 percent, by weight, of the high softening point component and from about 25 to about 60 percent, by weight, of the low softening point component. Desirably, the conjugate spunbond filaments contain from about 20 to about 85 percent, by weight of a polypropylene component and from about 15 to about 80 percent, by weight, of a polyethylene component. More desirably, conjugate spunbond filaments contain from about 40 to about 75 percent, by weight, of a polypropylene component and from about 25 to about 60 percent, by weight, of a polyethylene component.

If the filaments are formed from polyolefins such as, for example, a polypropylene, the nonwoven substrate may have a basis weight from about 3.5 or 10 to about 35 or 70 grams per square meter (gsm). The polymers may include additional materials such as, for example, pigments, antioxidants, flow promoters, stabilizers, and the like.

In an embodiment, the nonwoven continuous filament substrate may have a total bond area of less than about 30 percent and a uniform bond density greater than about 100 bonds per square inch. For example, the nonwoven continuous filament substrate may have a total bond area from about 20 to about 30 percent (as determined by conventional optical microscope methods) and a bond density from about 250 to about 500 pin bonds per square inch. Such a combination total bond area and bond density may be achieved by bonding the continuous filament substrate with a pin bond pattern having more than about 100 pin bonds per square inch which provides a total bond surface area less than about 30 percent when fully contacting a smooth anvil roll. Desirably, the bond pattern may have a pin bond density from about 250 to about 350 pin bonds per square inch and a total bond surface area from about 10 percent to about 25 percent when contacting a smooth anvil roll. Although pin bonding produced by thermal bond rolls is described above, any form of bonding which produces good tie down of the filaments with minimum overall bond area is contemplated. For example, a combination of thermal bonding and latex impregnation may be used to provide desirable filament tie down with minimum bond area. Alternatively and/or additionally, a resin, latex or adhesive may be applied to the nonwoven continuous filament web by, for example, spraying or printing, and dried to provide the desired bonding.

When conjugate spun filaments are used to form the nonwoven substrate or are included in the nonwoven substrate, the nonwoven substrate may be relatively lightly bonded or even unbonded prior to entanglement with the pulp layer and still produce a durable nonwoven composite fabric. Desirably, the conjugate spun filaments are conjugate melt-spun filaments. In particular, if the nonwoven substrate is a nonwoven layer of conjugate melt-spun filaments composed of at least one low softening point component and at least one high softening point component (in which at least some of the exterior surfaces of the filaments are composed of at least one low softening point component), it has been found that, as long as the web remains sufficiently coherent to be handled in the process, conventional levels of thermal bonding are not necessary prior to the hydraulic entangling step. In such cases, it is very desirable to carry out thermal treatment immediately after the hydraulic entangling is complete.

The pulp fiber layer is then laid on the nonwoven substrate which rests upon a foraminous entangling surface of a conventional hydraulic entangling machine. It is preferable that the pulp layer is between the nonwoven substrate and the hydraulic entangling manifolds. The pulp fiber layer and nonwoven substrate pass under one or more hydraulic entangling manifolds and are treated with jets of fluid to entangle the pulp fibers with the filaments of the continuous filament nonwoven substrate. The jets of fluid also drive pulp fibers into and through the nonwoven substrate to form the composite material. Alternatively, hydraulic entangling may take place while the pulp fiber layer and nonwoven substrate are on the same foraminous screen (i.e., mesh fabric) which the wet-laying took place. Also contemplated is superposing a dried pulp sheet on a continuous filament nonwoven substrate, rehydrating the dried pulp sheet to a specified consistency and then subjecting the rehydrated pulp sheet to hydraulic entangling.

The hydraulic entangling may take place while the pulp fiber layer is highly saturated with water. For example, the pulp fiber layer may contain up to about 90 percent by weight water just before hydraulic entangling. Alternatively, the pulp fiber layer may be an air-laid or dry-laid layer of pulp fibers. Hydraulic entangling a wet-laid layer of pulp fibers is desirable because the pulp fibers can be embedded into and/or entwined and tangled with the continuous filament substrate without interfering with "paper" bonding (sometimes referred to as hydrogen bonding) since the pulp fibers are maintained in a hydrated state. "Paper" bonding also appears to improve the abrasion resistance and tensile properties of the high pulp content composite fabric.

The hydraulic entangling may be accomplished utilizing conventional hydraulic entangling equipment such as may be found in, for example, U.S. Pat. No. 3,485,706 to Evans, the disclosure of which is hereby incorporated by reference to the extent it does not conflict with the disclosure herein. The hydraulic entangling may be carried out with any appropriate working fluid such as, for example, water. The working fluid flows through a manifold which evenly distributes the fluid to a series of individual holes or orifices. These holes or orifices may be from about 0.003 to about 0.015 inch in diameter. In various embodiments, a single manifold may be used or several manifolds may be arranged in succession.

In the hydraulic entangling process, the working fluid passes through the orifices at a pressure ranging from about 200 to about 2000 pounds per square inch gage (psig). At the upper ranges, it is contemplated that the composite fabrics may be processed at speeds of about 1000 feet per minute (fpm). The fluid impacts the pulp fiber layer and the nonwoven substrate which are supported by a foraminous surface which may be, for example, a single plane mesh having a mesh size of from about 40×40 to about 100×100. The foraminous surface may also be a multi-ply mesh having a mesh size from about 50×50 to about 200×200. As is typical in many water jet treatment processes, vacuum slots may be located directly beneath the hydro-needling manifolds or beneath the foraminous entangling surface downstream of the entangling manifold so that excess water is withdrawn from the hydraulically entangled composite material.

A relatively lightly bonded or unbonded nonwoven layer of conjugate, spunbond filaments (desirably conjugate, melt-spun filaments composed of at least one high softening point component and having at least some exterior surfaces of the filaments composed of at least one low softening point component) can be used to produce a durable high pulp content hydraulically entangled nonwoven composite fabric. When the relatively lightly bonded or unbonded layer of conjugate spun filaments is used in combination with a thermal treatment to cause regions in which the low softening point component at the surfaces of the filaments is fused to the pulp fibers, the resulting fabric has enhanced toughness, abrasion resistance and uniformity.

The use of a relatively lightly bonded or unbonded nonwoven layer of conjugate, spun filaments in combination with a thermal post treatment provides a coherent substrate which may be formed into a pulp fiber composite fabric by hydraulic entangling on only one side and still provide a strong, useful fabric as well as a composite fabric having desirable dimensional stability. The term "relatively lightly bonded" is used to described a generally coherent nonwoven matrix or layer of filaments and/or fibers that is held together primarily by interfiber entanglement and/or mechanical bonded in the absence of conventional levels of web bonding provided by standard web bonding techniques such as, for example, thermal pattern bonding and/or adhesive bonding.

The energy of the fluid jets that impact the pulp layer and substrate may be adjusted so that the pulp fibers are inserted into and entangled with the continuous filament substrate in a manner that enhances the two-sidedness of the fabric. That is, the entangling may be adjusted to produce high pulp fiber concentration on one side of the fabric and a corresponding low pulp fiber concentration on the opposite side. Alternatively, the continuous filament substrate may be entangled with a pulp fiber layer on one side and a different pulp fiber layer on the other side to create a composite fabric with two pulp-rich sides.

After the fluid jet treatment, the composite fabric may be transferred to a non-compressive drying operation. If desired, the composite fabric may be wet-creped prior to the drying operation. Non-compressive drying may be accomplished utilizing a conventional rotary drum through-air drying apparatus. The web may be dried first and then treated (e.g., heat treated) separately to create regions in which the low softening point component at the exterior surfaces of the filaments is fused to at least a portion of the fibrous component. The drying step may also be carried out in a manner that simultaneously created regions in which the low softening point component at the exterior surfaces of the filaments is fused to at least a portion of the fibrous component. Through-air drying processes have been found to work particularly well. Other drying processes which incorporate infrared radiation, yankee dryers, steam cans, vacuum dewatering, microwaves, and ultrasonic energy may also be used.

It may be desirable to use finishing steps and/or post treatment process to impart selected properties to the composite fabric of the hydroknit wipe. For example, the wipe may be lightly pressed by calendar rolls, creped or brushed to provide a uniform exterior appearance and/or certain tactile properties. Alternatively and/or additionally, chemical post treatments such as, adhesives or dyes can be added to the fabric. In various embodiments, the composition described herein can be applied to the hydroknit wipe such that the hydroknit wipe can wipe a surface clean and/or absorbent an oil based contaminant such as oil or grease. An example of a hydroknit wipe is the Wypall® X60 Wipers sold by Kimberly-Clark Professional, Roswell, Ga., U.S.A.

Paper Product

A "paper product" as described herein is meant to include products such as bath tissues, facial tissues, paper towels, industrial wipes, food service wipes, napkins, medical pads, and other similar products. The paper product can be a nonwoven sheet formed from a plurality of papermaking fibers and having a first outer surface and a second outer surface. The paper product may have one, two, three or more plies and each ply can be made from any suitable type(s) of papermaking fiber.

Papermaking fibers can include any pulp fibers, cellulosic fibers, other natural fibers, non-cellulosic synthetic fibers, chemithermomechanical fibers, or recycled cellulosic fibers which are known to be useful for making paper products. Fibers suitable for making a paper product can include, but are not limited to, any natural or synthetic cellulosic fibers including, but not limited to, nonwoody fibers, such as cotton, wool, human hair, boar bristles, abaca, kenaf, sabai grass, flax, esparto grass, straw, jute hemp, bagasse, milkweed floss fibers, and pineapple leaf fibers; and woody fibers such as those obtained from deciduous and coniferous trees, including softwood fibers, such as northern and southern softwood kraft fibers; hardwood fibers, such as eucalyptus, maple, birch, and aspen. Woody fibers can be prepared in high-yield or low-yield forms and can be pulped in any known method, including kraft, sulfite, high-yield pulping methods and other known pulping methods. A portion of the fibers, such as up to 50% or less by dry weight, or from about 5% to about 30% by dry weight, can be synthetic fibers such as rayon, polyolefin fibers, polyester fibers, polypropylene fibers, polystyrene fibers, butylene fibers, bicomponent sheath-core fibers, copolymer fibers, multi-component binder fibers, and the like. Any known bleaching method can be used. Synthetic cellulose fiber types include rayon in all its varieties and other fibers derived from viscose or chemically modified cellulose. Chemically treated natural cellulosic fibers can be used such as mercerized pulps, chemically stiffened or crosslinked fibers, or sulfonated fibers. Other papermaking fibers that can be used include recycled cellulosic fibers and high yield fibers. As used herein, recycled cellulosic fibers means any cellulosic fiber which has previously been isolated from its original matrix via physical, chemical or mechanical means and, further, has been formed into a fiber web, dried to a moisture content of about 10 weight percent or less and subsequently reisolated from its web matrix by some physical, chemical or mechanical means. High yield fibers are those papermaking fibers produced by pulping processes providing a yield of about 65% or greater, more specifically about 75% or greater, and still more specifically about 75% to about 95%. Yield is the resulting amount of processed fibers expressed as a percentage of the initial wood mass. Such pulping processes include bleached chemithermomechanical pulp, chemithermomechanical pulp, pressure/pressure thermomechanical pulp, thermomechanical pulp, thermomechanical chemical pulp, high yield sulfite pulps, and high yield kraft pulps, all of which leave the resulting fibers with high levels of lignin. High yield fibers are known for their stiffness in both dry and wet states relative to typical chemically pulped fibers.

Paper products can be made with a homogeneous fiber furnish or can be formed from a stratified fiber furnish producing layers within the single- or multi-ply product. Stratified base webs of the paper product can be formed using equipment known in the art, such as a multi-layered headbox. Both strength and softness of the base web can be adjusted as desired through manufacture of layers, such as those produced from stratified headboxes.

For instance, different fiber furnishes can be used in each layer in order to create a layer with the desired attributes. For example, layers containing softwood fibers have higher tensile strengths than layers containing hardwood fibers. Hardwood fibers, on the other hand, can increase the softness of the paper product. In an embodiment, a single ply can include a first outer layer and a second outer layer containing primarily hardwood fibers. The hardwood fibers can be mixed, if desired, with recycled cellulosic fibers in an amount up to about 10% by weight and/or softwood fibers in an amount up to about 10% by weight. The ply can further include a middle layer positioned in between the first outer layer and the second outer layer. The middle layer can contain primarily softwood fibers. If desired, other fibers such as high-yield fibers or synthetic fibers may be mixed with the softwood fibers in an amount up to about 10% by weight.

When constructing a ply from a stratified fiber furnish, the relative weight of each layer can vary depending upon the particular application. For example, in an embodiment, when constructing a ply containing three layers, each layer can be from about 15% to about 40% of the total weight of the ply, such as from about 25% to about 35% of the weight of the ply.

Wet strength resins may be added to the furnish as desired to increase the wet strength of the final paper product. Useful wet strength resins include diethylenetriamine (DETA), triethylenetetramine (TETA), tetraethylenepentamine (TEPA), epichlorohydrin resin(s), polyamide-epichlorohydrin (PAE), or any combinations thereof, or any resins to be considered in these families of resins. Particularly preferred wet strength resins are polyamide-epichlorohydrin (PAE) resins. Commonly PAE resins are formed by first reacting a polyalkylene polyamine and an aliphatic dicarboxylic acid or dicarboxylic acid derivative. A polyaminoamide made from diethylenetriamine and adipic acid or esters of dicarboxylic acid derivatives is most common. The resulting polyaminoamide is then reacted with epichlorohydrin. Useful PAE resins are sold under the tradename Kymene® (commercially available from Ashland, Inc., Covington, Ky.).

Similarly, dry strength resins can be added to the furnish as desired to increase the dry strength of the final paper product. Such dry strength resins include, but are not limited to carboxymethyl celluloses (CMC), any type of starch, starch derivatives, gums, polyacrylamide resins, and others as are well known. Commercial suppliers of such resins are the same as those that supply the wet strength resins discussed above.

The paper products can generally be formed by any of a variety of papermaking processes known in the art. In various embodiments, the base web of the paper product is formed by through-air drying and can be either creped or uncreped. For example, a papermaking process can utilize adhesive creping, wet creping, double creping, embossing, wet-pressing, air pressing, through-air drying, creped through-air drying, uncreped through-air drying, as well as other steps in forming the base web. Some examples of such techniques are disclosed in U.S. Pat. Nos. 5,048,589, 5,399, 412, 5,129,988 and 5,494,554 all of which are incorporated herein in a manner consistent with the present disclosure. When forming multi-ply tissue products, the separate plies can be made from the same process or from different processes as desired.

In various embodiments, the base web is formed by an uncreped through-air drying process, such as the processes described, for example, in U.S. Pat. Nos. 5,656,132 and 6,017,417, both of which are hereby incorporated by reference herein in a manner consistent with the present disclosure.

In an uncreped through-air drying process, a twin wire former can have a papermaking headbox which injects or deposits a stream of an aqueous suspension of papermaking fibers onto the forming fabric which serves to support and carry the newly-formed wet web downstream in the process as the wet web is partially dewatered to a consistency of about 10 dry weight percent. Additional dewatering of the wet web may be carried out by known paper making techniques, such as vacuum suction boxes. The wet web may be additionally dewatered to a consistency of greater than 20 percent, more specifically between about 20 to about 40 percent, and more specifically about 20 to about 30 percent. The wet web is then transferred from the forming fabric to a transfer fabric traveling at a slower speed than the forming fabric in order to impart increased strength into the web. Transfer can be carried out with the assistance of a vacuum shoe. The wet web is then transferred from the transfer fabric to the through-air drying fabric with the aid of a vacuum transfer roll or a vacuum transfer shoe. The through-air drying fabric can be traveling at about the same speed or a different speed relative to the transfer fabric. If desired, the through-air drying fabric can be run at a slower speed to further enhance stretch. While supported by the through-air drying fabric, the wet web is dried to a consistency of about 94 percent or greater by the through-air dryer. The drying process can be any noncompressive drying method which tends to preserve the bulk or thickness of the wet web including, without limitation, through-air drying, infrared radiation, microwave drying, etc.

In order to provide stretch to the paper product, a speed differential is provided between fabrics at one or more points of transfer of the wet web. This process is known as rush transfer. The speed difference between the forming fabric and the transfer fabric can be from about 5 to about 75 percent or greater, such as from about 10 to about 35 percent. For instance, in an embodiment, the speed difference can be from about 15 to about 25 percent, based on the speed of the slower transfer fabric. The stretch can be imparted to the web using a single differential speed transfer or two or more differential speed transfers of the wet web prior to drying. Hence there can be one or more transfer fabrics. The amount of stretch imparted to the web can hence be divided among one, two, three or more differential speed transfers. Rush transfer from one fabric to another can follow the principles taught in any one of the following patents, U.S. Pat. Nos. 5,667,636, 5,830,321, 4,440,597, 4,551,199, 4,849,054, all of which are hereby incorporated by reference herein in a manner consistent with the present disclosure.

Softening agents can be used to enhance the softness of the paper product and such softening agents can be incorporated with the fibers before, during, or after formation of the aqueous suspension of fibers. Such agents can also be sprayed or printed onto the web after formation of the wet web. Suitable agents include, but are not limited to, fatty acids, waxes, quaternary ammonium salts, dimethyl dehydrogenated tallow ammonium chloride, quaternary ammonium methyl sulfate, carboxylated polyethylene, cocamide diethanol amine, coco betaine, sodium lauryl sarcosinate, partly ethoxylated quaternary ammonium salt, distearyl dimethyl ammonium chloride, polysiloxanes, and the like. The softening agents can be added in an amount from about 0.05, 0.25, or 0.5 to about 0.75 or 1 weight percent based upon the weight of the fiber.

The basis weight of webs made can vary depending upon the final paper product. In general, the basis weight of the web may vary from about 15, 16, 18, 30 or 30 gsm to about 32, 34, 36, 40, 45, 60 or 80 gsm.

In various embodiments, a topical binder may be used to bond the papermaking fibers together which can impart added strength to the final paper product. In various embodiments, a binder can be added onto each side of an uncreped through-dried web and each side of the web can then be creped. Binder may be "added" by gravure printing, flexo printing, coating, spraying, ink jet, or hot melt applications. In various embodiments, the web for the paper product is first formed by conventional means and then rush-transferred and through-air dried (and not creped or calendared). Next, each side of the uncreped, through-air dried base sheet has binder added to it, and then each side of the base sheet is creped.

The binder composition can be applied to one or more surfaces of the ply or plies within the product. For example, a single-ply product can have one or both surfaces treated with the binder composition. A two-ply product can have one or both outer surfaces treated with the binder composition and/or one or both inner surfaces treated with the binder composition. In the case of a two-ply product, it can be advantageous to have one or both binder-treated surfaces plied inwardly in order to expose the untreated surface(s) of the plies on the outside of the product for purposes of hand-feel or absorbency. When the binder is applied to the inner surfaces of a multi-ply product, the binder also provides a means of bonding the plies together. In such cases, mechanical bonding may not be required. In the case of a three-ply product, the same options are available. The surface area of the coverage of the binder composition on the fibrous web can be about 5 percent or greater, more specifically about 30 percent or greater, sill more specifically, from about 5 to about 90 percent or from about 20 to about 75 percent.

The binder composition can be applied to one or both surfaces of the fibrous web by any suitable method such as printing, spraying, coating, foaming and the like. Curing temperatures for the binder composition can be about 260° C. or less, more specifically about 120° C. or less, more specifically about 100° C. or less, more specifically about 40° C. or less, more specifically from about 10 to about 260° C. and still more specifically from about 20 to about 120° C. It will be appreciated that although the binder compositions can be cured at relatively low temperatures, the rate of curing can be accelerated at higher temperatures associated with curing conventional binders.

After the paper product is formed and dried, the paper product can undergo any subsequent converting process. In an embodiment, the paper product can undergo a shear calendaring process in order to generate a high value of fuzziness while maintaining sufficient tensile strength. In an embodiment, the paper product can be placed into final packaging comprising an air impermeable material.

EXAMPLES

Example 1: Copolymer Solubility Test

To test the solubility of a copolymer in a solvent, an amount of the copolymer can be added to a volume of the solvent and observed over time. For example, three copolymers were evaluated for their solubility in a variety of potential solvents. The three copolymers which were evaluated were: polystyrene-polyisoprene-polystyrene (styrene at 14 wt %)(Sigma-Aldrich Chemical Company), ethylene-octene-1 (Dow™ Affinity®), and alpha-methylstyrene-vinyltoluene (Eastman™ Regalrez®). To test the solubility of each of the copolymers in solvents, 0.1 g of the copolymer was placed in a 20 ml vial followed by 10 ml of solvent and the vial was then sealed with a cap. Each vial was placed at ambient temperature (25° C.) and observed over 10 hours. If a copolymer was completely dissolved a check mark ("✓") will appear in Table 1 below. If the copolymer did not dissolve completely, an "X" will appear in Table 1 below.

TABLE 1

| Solvent | Polystyrene-polyisoprene-polystyrene | Ethylene-octene-1 | Alpha-methylstyrene-vinyltoluene |
| --- | --- | --- | --- |
| Dimethoxymethane | ✓ | X | X |
| Toluene | ✓ | ✓ | ✓ |
| Xylene | ✓ | ✓ | ✓ |
| Acetonitrile | X | X | X |
| 1-butanol | X | X | X |

TABLE 1-continued

| Solvent | Polystyrene-polyisoprene-polystyrene | Ethylene-octene-1 | Alpha-methylstyrene-vinyltoluene |
|---|---|---|---|
| Methylethylketone | ✓ | X | X |
| Mineral spirits | ✓ | X | ✓ |
| Acetone | X | X | X |
| tetrahydrofuran | ✓ | X | ✓ |

As can be seen from Table 1, the solvents of mineral spirits, methylethylketone, toluene, p-xylene, tetrahydrofuran, and dimethoxymethane were found to be suitable solvents within which the copolymers could dissolve.

Example 2: Surface Adhesion

As described herein, another desired attribute of the composition described herein is the ability to adhere to a variety of surfaces. To demonstrate the test for surface adhesion, 4 grams of polystyrene-block-polyisoprene-block-polystyrene (styrene at 14 wt %, available from Sigma-Aldrich Chemical Company) was dissolved in 60 ml dimethoxymethane (available from Sigma-Aldrich Chemical Company) at room temperature. This solution was then sprayed using a Prevail spray gun (Prevail Co., Coal City, Ill.) onto four different surfaces: 1) aluminum sheet metal, 12"×12"×0.25" (available from Grainger Co., Loves Park, Ill.), 2) polycarbonate sheet, 12"×12"×⅛" (available from Grainger Co., Loves Park, Ill.), 3) Glass Sheet, 12"×12"×⅛", and 4) black laboratory bench top (mineral-polymer composite). Each sprayed sample was allowed to dry for 10-15 seconds. The dried compositions were then peeled from each surface to make a visual observation as to whether surface adhesion was achieved. For each of the four surfaces, the coating of the dried composition was observed to have adhered to each surface and yet could be easily peeled off of each surface.

Example 3: Oil-Based Contaminant Absorption

To test the oleophilicity of the composition, 0.25 g of each of engine oil (Chevron SAE 30 10W30), grease (lard, Armour brand, ConAgra Foods, Omaha, Nebr.), vegetable oil (Safflower oil, Ventura Foods LLC) was applied to the surface of an aluminum metal sheet, 12"×12"×0.25" (available from Grainger Co., Loves Park, Ill.) and using a gloved finger spread across the surface to form a light streak (6 inches long and 1 inch wide). The liquid composition was 4 grams of polystyrene-block-polyisoprene-block-polystyrene dissolved in 60 ml of dimethoxymethane. A light spray coating was applied on top of the streaks and allowed to dry for about 20 seconds to form a film. The film was then removed by peeling the film off of the aluminum surface. On visible inspection, no visible sign of the oil or grease was observed on the aluminum surface. The composition, therefore, absorbed and removed the oils and grease from the surface in a single easy step.

Example 4: Protective Coating for Painting Processes

Aluminum plates (having a 6" diameter hole in the center) and polycarbonate sheets (Grainger Company, Loves Park, Ill.) were glued together using a 5 minute epoxy glue (Loctive® Heavy Duty [5 min, 3500 psi], Henkel Corp.). The polycarbonate sheet formed the "window" within the hole of the aluminum plate to model a vehicle or airplane window. The liquid composition was 4 grams of polystyrene-block-polyisoprene-block-polystyrene dissolved in 60 ml of dimethoxymethane. The liquid composition was brushed onto the polycarbonate window, using a 1 inch paint brush (Craftsmart® 1 inch with 1.5 inch bristles) as a mask before spray painting. The liquid composition was allowed to dry. Red enamel spray paint ("Fire Red" ColorTouch® Spray Enamel by Krylon Products Group) was applied to the metal and the composition mask. When the paint was dry (about 20 minutes), the mask was peeled off to leave a clean line on the metal with no paint on the polycarbonate window. The mask was found to peel off easily taking the paint overspray with it.

Example 5: Visual Change Indicator

The liquid composition was formulated with 4 grams of polystyrene-block-polyisoprene-block-polystyrene dissolved in 60 ml of dimethoxymethane. An amount, 0.02 grams, of fluorescein (Sigma-Aldrich Chemical Co., Milwaukee, Wis.) was added to the liquid composition. The fluorescein is soluble in organic solvents. With the addition of the fluorescein, the liquid composition was pale pink in color. Upon drying, the color changed from pale pink to bright orange.

Example 6: Determination of Oil Capacity Over Time

A 0.27 gram sample of a dried copolymer film (4 grams of polystyrene-block-polyisoprene-block-polystyrene dissolved in 60 ml of dimethoxymethane (14 wt % styrene)) was placed in an excess of engine oil (100 grams Chevron SAE 30, 10W30) in a 8"×12" Pyrex® baking dish. The film was then removed, blotted with paper towels and weighed. This was repeated over certain time points. Table 2 shows the weight gain over time.

TABLE 2

| Time (min) | Weight of film plus oil (grams) |
|---|---|
| 0 | 0.27 |
| 10 | 0.35 |
| 20 | 0.38 |
| 30 | 0.42 |
| 40 | 0.45 |
| 75 | 0.52 |
| 110 | 0.58 |
| 235 | 0.72 |
| 320 | 0.77 |

These steps were repeated over additional time. After 32 hours, the film sample had absorbed 3.3 grams of oil per gram of copolymer film. Following 32 hours, the film sample had grown to 4 times its starting size.

Example 7: Absorption of Different Types of Oils

A series of common oils and lubricants were tested to determine how well an elastomeric copolymer (an ethylene-octene block copolymer sold under the trade name Infuse™ 9807 by Dow Chemical Co.) absorbs different oil and lubricant types:

Ethylene glycol (antifreeze) (available from Sigma-Aldrich Chemical Co., Milwaukee, Wis.)

Brake fluid 672701 (available from Atlas Supply Co., Springfield, N.J.)

Automatic transmission fluid (available from Sovereign Oil Co., Chicago, Ill.)

Safflower Oil (available from Ventura Foods, Brea, Calif.)

Synthetic 10W30 motor oil (available from Kendall, Houston, Tex.)

Motor Oil 10W30 Mototech (available from The Kroger Co., Cincinnati, Ohio)

A known weight of the dried elastomeric copolymer film, about 0.4 grams, was placed in an excess of each of the listed oil/lubricants, about 100 ml, for a period of time. At certain time points, the film was then removed, blotted with paper towels, and weighed. The results are shown in Table 3 below.

TABLE 3

| Oil/Lubricant | Sample | Base wt (g) | wt. 1 min (g) | wt. 2 min (g) | wt. 5 min (g) | wt. 10 min (g) |
|---|---|---|---|---|---|---|
| Safflower Oil | 1 | 0.41 | 0.74 | 0.72 | 0.74 | 0.74 |
|  | 2 | 0.41 | 0.75 | 0.73 | 0.76 | 0.71 |
| Avg wt % absorbed |  |  | 82% | 77% | 82% | 77% |
| Transmission Fluid | 1 | 0.41 | 1.29 | 1.53 | 1.6 | 1.58 |

TABLE 3-continued

| Oil/Lubricant | Sample | Base wt (g) | wt. 1 min (g) | wt. 2 min (g) | wt. 5 min (g) | wt. 10 min (g) |
|---|---|---|---|---|---|---|
| Antifreeze | 1 | 0.41 | 0.43 | 0.43 | 0.43 | 0.44 |
|  | 2 | 0.41 | 0.43 | 0.43 | 0.43 | 0.43 |
| Avg wt % absorbed |  |  | 5% | 5% | 5% | 5% |
| Motor Oil | 1 | 0.4 | 1.23 | 1.53 | 1.57 | 1.63 |
|  | 2 | 0.41 | 1.25 | 1.49 | 1.58 | 1.6 |
| Avg wt % absorbed |  |  | 206% | 273% | 289% | 299% |

The results in Table 3 show that the elastomeric copolymer has good oil absorption of most oil and lubricant types with the exception of small alcohol based oils such as antifreeze (ethylene glycol) which are more hydrophilic in nature. The safflower oil (unsaturated fatty acids) was absorbed and, therefore, this coating could be used in the kitchen environment.

Table 4 shows additional absorption characteristics of various elastomeric copolymers against engine oil (Chevron SAE 30, 10W30), as measured in gram of oil/gram of copolymer, at different time periods of 24 hours, 48 hours, and 72 hours.

TABLE 4

| Sample | 24 hour g/g | 48 hour g/g | 72 hour g/g |
|---|---|---|---|
| Polypropylene polyethylene copolymer, 16% polyethylene (melt index of 1.4 g/10 min @ 190° C./2.16 kg) | 0.37 | 0.44 | 0.58 |
| Polypropylene polyethylene copolymer, 15% polyethylene (melt index of 9.1 g/10 min @ 190° C./2.16 kg | 0.19 | 0.48 | 0.63 |
| Styrene ethylene butylene styrene block copolymer, 30% styrene | 0.27 | 0.47 | 0.69 |
| Styrene-isoprene-styrene, 22% styrene | 0.31 | 0.46 | 0.58 |
| Styrene-isoprene-styrene, 28% styrene | 0.32 | 0.46 | 0.57 |
| Styrene-isoprene-styrene, 22% styrene | 0.33 | 0.49 | 0.61 |
| Ethylene octene block copolymer, 18% octane, 67 wt. % soft segment, 20% crystallinity (44.6 wt. % hard block) (melt index of 5 g/10 min @ 190° C./2.16 kg | 0.36 | 0.49 | 0.59 |
| Styrene-isoprene-styrene, 17% styrene | 0.38 | 0.58 | 0.77 |
| Ethylene octene block copolymer, (13.5% hard block) (0.866 g/cc) (5.0 (g/10 min @ 190° C./2.16 kg) | 0.50 | 0.85 | 1.15 |
| Styrene-isoprene-styrene, 14% styrene | 0.62 | 1.02 | 1.37 |
| Ethylene octene block copolymer, 18% octane, 89 wt. % soft segment, 7% crystallinity (melt index of 0.5 g/10 min @ 190° C./2.16 kg) | 0.82 | 1.27 | 1.68 |
| Ethylene octene block copolymer, (0.866 g/cc) (melt index of 1.0 g/10 min @ 190° C./2.16 kg) | 0.86 | 1.38 | 1.71 |
| Metallocene catalyzed ethylene/1-octene copolymer, 16% crystallinity (16 wt % hard block) (melt index of 1000 g/10 min @ 190° C./2.16 kg) | 1.03 | 1.10 | 1.10 |
| Aminated ethylene-octene block copolymer (0.866 g/cc) (melt index of 15 g/10 min @ 190° C./2.16 kg) | 1.37 | 2.04 | 2.36 |
| Styrene ethylene butylene styrene block copolymer; polyethylene; tackifying agent blend | 1.54 | 2.75 | 3.06 (dissolves) |

TABLE 3-continued

| Oil/Lubricant | Sample | Base wt (g) | wt. 1 min (g) | wt. 2 min (g) | wt. 5 min (g) | wt. 10 min (g) |
|---|---|---|---|---|---|---|
|  | 2 | 0.4 | 1.29 | 1.5 | 1.61 | 1.6 |
| Avg wt % absorbed |  |  | 219% | 274% | 297% | 293% |
| Brake fluid | 1 | 0.41 | 0.67 | 0.68 | 0.67 | 0.7 |
|  | 2 | 0.41 | 0.66 | 0.7 | 0.65 | 0.71 |
| Avg wt % absorbed |  |  | 62% | 68% | 61% | 72% |
| Synthetic Motor Oil | 1 | 0.4 | 1.19 | 1.45 | 1.49 | 1.5 |
|  | 2 | 0.41 | 1.16 | 1.4 | 1.5 | 1.54 |
| Avg wt % absorbed |  |  | 191% | 252% | 270% | 275% |

Example 8: Applying the Elastomeric Copolymer Composition Via Roller Ball Applicator A solution of a polystyrene-polyisoprene-polystyrene (14% polystyrene) was dissolved in dimethoxymethane (1:1) and was placed in a roller ball applicator (available from Lotion Crafter, Eastsound, Wash.) and shown to deliver a complete 2-4 mm thick layer of the elastomeric copolymer composition coating on most surfaces including metal, glass, tile, and the like. After allowing the composition to dry, the dried film was easily removed by peeling off as an elastic layer.

Example 9: Application as a Coating on a Wipe

Wypall® X-60 Hydroknit wipes were lightly spray coated with a liquid copolymer composition (4 grams of polystyrene-block-polyisoprene-block-polystyrene dissolved in 60 ml of dimethoxymethane). One sample of the liquid copolymer composition further included 0.02 grams of fluorescein as a visual change indicator. Following the spraying of each of the wipes, the liquid copolymer compositions were allowed to dry. Typical add-ons ranged from 5% wt/wt to 28% wt/wt. Next, 0.25 g of engine oil (Chevron SAE 30, 10W30) was streaked onto an aluminum plate as three lines. The wipes (wipe control, wipe with copolymer composition, wipe with copolymer composition and visual change indicator) were each placed onto one of the oil streaks and then a second aluminum plate was placed on top of the wipes to compress the wipes into the oil for 20 seconds and then removed. Table 5 provides the measurement of the oil in each of the wipes.

TABLE 5

| Sample | Wipe Control | Wipe + Copolymer | Wipe + Copolymer + Visual Change Indicator |
|---|---|---|---|
| Oil in wipe (grams) | 0.05 | 0.27 | 0.29 |

The wipes with the copolymer composition were able to absorb about 5 times more oil when compared with the wipe control.

Example 10: Application as a Coating on a Wipe

Identical samples of Wypall® X-60 Hydroknit wipes (7 cm×14 cm) were coated with the liquid copolymer solution (4 grams of polystyrene-block-polyisoprene-block-polystyrene dissolved in 60 ml of dimethoxymethane) at different add-on levels. Each wipe was then placed in a bath of engine oil (100 grams Chevron SAE 30, 10W30 in an 8"×12" Pyrex® baking dish for 10 minutes. Following the 10 minutes, each wipe was removed from the bath of engine oil and lightly blotted with paper towels and the oil add-on was measured. Table 6 below provides the measurement of the oil in each of the wipes.

TABLE 6

| Copolymer wt % | Oil Capacity wt % |
|---|---|
| 0.0 | 250 |
| 0.16 | 279 |
| 1.1 | 294 |
| 20.0 | 351 |
| 22.3 | 361 |
| 31.3 | 366 |

A steady state increase in oil capacity was observed until about 20 wt % of copolymer solution on the wipes.

Example 11: Coefficient of Friction

To evaluate the coefficient of friction when cleaning a contaminated surface, the elastomeric copolymer composition was applied to the contaminated surface as a liquid composition which was then allowed to dry and also via a wipe containing a coating of the elastomeric composition. Both techniques of application of the elastomeric composition were further compared against a wipe which did not contain a coating of the elastomeric composition. The elastomeric copolymer composition was prepared by dissolving 4 grams of polystyrene-block-polyisoprene-block-polystyrene (14 wt % styrene) in 60 ml of dimethoxymethane. The elastomeric copolymer composition when then sprayed onto Wypall® X-60 Hydroknit wipes (7 cm×14 cm) at different add-on levels.

Engine oil, 0.25 grams, (Chevron SAE 30, 10W30) was streaked onto an aluminum plate in four lines. A hydroknit wipe without the elastomeric copolymer composition and each of the coated hydroknit wipes were used to wipe three of the lines of engine oil, respectively. The elastomeric copolymer composition by itself was also sprayed onto the fourth line of engine oil. The Gardner Abrasion Test was performed and Table 7 outlines of the coefficient of friction for each application technique. The Gardner Abrasion Test follows ASTM 1792. The Gardner Abrasion Tester II abrasion tester (BYK Instruments, Geretsried, Germany) offers a versatile design for abrasion and coefficient of friction. The instrument arm is designed to hold from 1-3 brush holders or shuttle for wipes or towels. The test method was followed as written with the following notations: 1) the wipe was placed under the shuttle, 2) 1 cycle is 3 seconds, 3) 1 lb was applied to the instrument arm, and 4) the stroke length was 11 inches.

TABLE 7

| Sample | Coefficient of Friction |
|---|---|
| Hydroknit wipe with 25% wt/wt Add-On Level of Coating | 0.4424 |
| Hydroknit wipe with 17% wt/wt Add-On Level of Coating | 0.3328 |
| Elastomeric Copolymer Composition | 0.3002 |
| Hydroknit Wipe | 0.1482 |

The hydroknit wipes coated with the elastomeric copolymer composition had a higher coefficient of friction than the hydroknit wipe without the coating of the elastomeric copolymer composition. The elastomeric copolymer composition can provide a "squeegee" effect and can help scrape the oil off of the surface and into the hydroknit wipe.

Example 12: Patterned Coating of Elastomeric Copolymer Composition

Wypall® X-60 wipes and Scott® paper towels (both available from Kimberly-Clark Corporation) were lightly sprayed with a solution of 6 grams of polystyrene-polyisoprene-polystyrene (14% polystyrene) dissolved in 60 ml dimethoxymethane. The copolymer solution was sprayed onto the wipes and towels in a lined pattern. The lined patterns were achieved by placing a Weber® grill grate on top of the wipes and towels first before spraying. After spraying the composition onto the wipes and towels, the grill grate was lifted off to reveal the elastomeric copolymer composition coating in a line or tread pattern. Various subsequent tread designs were achieved by rotating the grill grate to obtain zig-zag tread patterns. Repeated oil wiping testing showed the "tread-like" patterned wipes and towels were able to absorb 1.5-2 times as much engine oil as a lightly coated wipe/towel. This it thought to be due, in part, to the tread design delivering the squeegee effect of high friction, but the gaps (no copolymer coating) allowed faster oil flow through and capture. Furthermore, it is believed the tread-like pattern allowed for the squeegee to channel the oil to the uncoated areas for improved wicking and capture.

EMBODIMENTS

Embodiment 1

A liquid composition comprising an elastomeric copolymer and a solvent in which the elastomeric copolymer is dissolved wherein the composition is configured to dry after being applied to a surface, leaving an elastomeric copolymer film.

Embodiment 2

The liquid composition of embodiment 1 wherein the elastomeric copolymer is oleophilic.

Embodiment 3

The liquid composition of embodiment 1 wherein the elastomeric copolymer is selected from polystyrene-polyisoprene-polystyrene, polystyrene-block-polybutadiene-block-polystyrene, polystyrene-block-poly(ethylene-ran-polybutylene)-block-polystyrene, polystyrene-block-polybutadiene-block-polystyrene, alpha-methylstyrene-vinyltoluene-copolymer, and ethylene-octene-1 copolymer.

Embodiment 4

The liquid composition of any one of the preceding embodiments wherein the solvent is selected from mineral spirits, methylethylketone, toluene, p-xylene, tetrahydrofuran, and dimethoxymethane.

Embodiment 5

The liquid composition of any one of the preceding embodiments wherein the composition is configured to be sprayable.

Embodiment 6

The liquid composition of any one of the preceding embodiments further comprising a color changing indicator, configured to change color after the composition is dry.

Embodiment 7

A method of absorbing an oil-based contaminant from a surface comprising the steps of applying the liquid composition of any one of the preceding embodiments to a surface having an oil-based contaminant thereon, allowing the liquid composition to dry, and peeling the dried composition from the surface.

Embodiment 8

A method of protecting a surface in vehicle, building, or airplane painting operations from paint overspray comprising the steps of applying the liquid composition of any one of embodiments 1-6 to the surface to be protected, allowing the liquid composition to dry, painting the vehicle, building or airplane, the dried composition preventing the paint from contacting the surface to be protected, and peeling the dried composition from the surface.

Embodiment 9

An oleophilic nonwoven comprising the liquid composition of any one embodiments 1-6 applied to a nonwoven material.

Embodiment 10

The nonwoven of embodiment 9 wherein the elastomeric copolymer is selected from polystyrene-polyisoprene-polystyrene, polystyrene-block-polybutadiene-block-polystyrene, polystyrene-block-poly(ethylene-ran-polybutylene)-block-polystyrene, polystyrene-block-polybutadiene-block-polystyrene, alpha-methylstyrene-vinyltoluene-copolymer, and ethylene-octene-1 copolymer.

Embodiment 11

The nonwoven of embodiment 9 or embodiment 10 wherein the solvent is selected from mineral spirits, methylethylketone, toluene, p-xylene, tetrahydrofuran, and dimethoxymethane.

Embodiment 12

The nonwoven of any one of embodiments 9-11 wherein the liquid composition further comprises a color changing indicator.

Embodiment 13

The nonwoven of any one of embodiments 9-12 wherein the liquid composition is applied to the nonwoven in a pattern wherein the pattern comprises at least one of a dot, line, circle, or wavy line.

Embodiment 14

A method of absorbing an oil-based contaminant from a surface comprising the step of wiping the contaminated surface with the nonwoven of any one of embodiments 9-13.

Embodiment 15

The method of embodiment 14 further comprising the step of wiping a second surface with the nonwoven wherein the oil-based contaminant is not transferred to the second surface from the nonwoven.

When introducing elements of the present disclosure or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements. Many modifications and variations of the present disclosure can be made without departing from the spirit and scope thereof. Therefore, the exemplary embodiments described above should not be used to limit the scope of the invention.

What is claimed is:

1. A liquid composition comprising an elastomeric copolymer and a solvent in which the elastomeric copolymer is dissolved wherein the composition is configured to dry after being applied to a surface, leaving an elastomeric copolymer film configured to be peeled away from the surface, the composition further comprising a color changing indicator configured to change color after the composition is dry.

2. The liquid composition of claim 1 wherein the elastomeric copolymer is oleophilic.

3. The liquid composition of claim 1 wherein the elastomeric copolymer is selected from polystyrene-polyisoprene-polystyrene, polystyrene-block-polybutadiene-block-polystyrene, polystyrene-block-poly(ethylene-ran-polybutylene)-block-polystyrene, polystyrene-block-polybutadiene-block-polystyrene, alpha-methylstyrene-vinyltoluene-copolymer, and ethylene-octene-1 copolymer.

4. The liquid composition of claim 1 wherein the solvent is selected from mineral spirits, methylethylketone, toluene, p-xylene, tetrahydrofuran, and dimethoxymethane.

5. The liquid composition of claim 1 wherein the composition is configured to be sprayable.

6. A method of protecting a surface in vehicle, building, or airplane painting operations from paint overspray comprising the steps of applying the liquid composition of claim 1 to the surface to be protected, allowing the liquid composition to dry, painting the vehicle, building or airplane, the dried composition preventing the paint from contacting the surface to be protected, and peeling the dried composition from the surface.

7. A method of absorbing an oil-based contaminant from a surface comprising the steps of applying a liquid composition to a surface having an oil-based contaminant thereon, the liquid composition comprising an elastomeric copolymer and a solvent in which the elastomeric copolymer is dissolved wherein the composition is configured to dry after being applied to a surface leaving an elastomeric copolymer film, allowing the liquid composition to dry, and peeling the dried composition from the surface.

8. An oleophilic nonwoven comprising a liquid composition applied to a nonwoven material, the liquid composition comprising an elastomeric copolymer, a solvent in which the elastomeric copolymer is dissolved, and a color changing indicator, wherein the composition is configured to dry after being applied to a surface, leaving an elastomeric copolymer film.

9. The nonwoven of claim 8 wherein the elastomeric copolymer is selected from polystyrene-polyisoprene-polystyrene, polystyrene-block-polybutadiene-block-polystyrene, polystyrene-block-poly(ethylene-ran-polybutylene)-block-polystyrene, polystyrene-block-polybutadiene-block-polystyrene, alpha-methylstyrene-vinyltoluene-copolymer, and ethylene-octene-1 copolymer.

10. The nonwoven of claim 8 wherein the solvent is selected from mineral spirits, methylethylketone, toluene, p-xylene, tetrahydrofuran, and dimethoxymethane.

11. The nonwoven of claim 8 wherein the liquid composition is applied to the nonwoven in a pattern wherein the pattern comprises at least one of a dot, line, circle, or wavy line.

12. A method of absorbing an oil-based contaminant from a surface comprising providing an oleophilic nonwoven comprising a liquid composition applied to a nonwoven material, the liquid composition comprising an elastomeric copolymer and a solvent in which the elastomeric copolymer is dissolved, wiping the contaminated surface with the nonwoven, wherein the composition is configured to dry after being applied to the surface, leaving an elastomeric copolymer film, and wiping a second surface with the nonwoven wherein the oil-based contaminant is not transferred to the second surface from the nonwoven.

* * * * *